United States Patent [19]
Kiatipov et al.

[11] Patent Number: 4,782,482
[45] Date of Patent: Nov. 1, 1988

[54] SIMULTANEOUS VOICE AND DATA COMMUNICATIONS SYSTEM

[75] Inventors: Edmundo V. Kiatipov; Carlos Hita de la Torre, both of Madrid, Spain

[73] Assignee: Alcatel Standard Electrica S.A., Madrid, Spain

[21] Appl. No.: 779,174

[22] Filed: Sep. 23, 1985

[51] Int. Cl.$^4$ ................... H08J 3/00; H08M 11/04
[52] U.S. Cl. ................... 370/86; 340/310 A; 340/825.05
[58] Field of Search ........ 370/86, 88, 89, 85, 370/110.1; 340/825.5, 310 K, 310 R, 825.05

[56] References Cited

U.S. PATENT DOCUMENTS

| | | | |
|---|---|---|---|
| 4,097,692 | 6/1978 | Felix | 370/85 |
| 4,510,492 | 4/1985 | Mori et al. | 370/86 |
| 4,514,841 | 4/1985 | Sem-Sandberg | 370/86 |
| 4,521,882 | 6/1985 | Gabrielli et al. | 370/85 |
| 4,530,093 | 7/1985 | Akram et al. | 370/85 |
| 4,567,590 | 1/1986 | Bederman | 370/86 |
| 4,689,605 | 8/1987 | Laue | 340/310 A |

FOREIGN PATENT DOCUMENTS 2132449A 7/1984 United Kingdom .

OTHER PUBLICATIONS

Proceedings National Telecommunications Conference T. Matsuda (1981).
Review of the Electrical Communication Laboratories Isao Kawashima (1982).
Proceedings IEEE International Conference on Communications-Kunio Hiyama (1983).
Mini-Micro Systems (1984) K. Jones.
Local Networks & Distributed Office Systems, vol. 1 (1982) Online Publ. Ltd.

*Primary Examiner*—Douglas W. Olms
*Assistant Examiner*—Frank M. Scutch, III
*Attorney, Agent, or Firm*—Spencer & Frank

[57] ABSTRACT

A communications system for simultaneously conveying voice and data messages is provided in accordance with the teachings of the present invention. In the communications system disclosed a ring transmission medium for the serial transmission of message information is provided. A plurality of taps are disposed along the ring transmission medium and each of the plurality of taps acts to receive connections from a communications module having at least an input and an output and acts to connect the communications module to the ring. Each of the plurality of taps is configured to have its inputs and outputs connected to the ring and act when no communication module is connected thereto to convey message information on the ring directly between the input and outputs of the tap. When a communications module is connected to that tap, message information is applied from the ring to the input of the communications module and from the output of the communications module to the ring transmission medium. A plurality of individual telephone stations for communicating voice messages are connected to the ring through individual ones of the taps wherein each of the telephone stations takes the form of a communications module having a basic component nucleus for interfacing with the ring and at least one additional component for performing telephone station functions. A data access unit for connection to one of the plurality of taps acts to couple data messages to the ring. The data access unit also includes the basic component nucleus for interfacing with the ring and at least a further component for coding digital data applied thereto. The data access unit may be connected to terminal devices or the like.

16 Claims, 4 Drawing Sheets

SIMULTANEOUS VOICE AND DATA COMMUNICATIONS SYSTEM

BACKGROUND OF THE INVENTION

The present invention relates to a simultaneous voice and data communications system using telephone stations and data terminal equipments, with possibility of connection to public or private networks.

Business communication systems have undergone an evolution which, starting from electromechanical systems with voice communication services, have developed to advanced systems, providing an integral solution to the communications requirements in office automation.

The first systems to be considered when analyzing the generic problem of communication in offices, are those fundamentally concerning voice switching. These systems in almost all cases have adopted one of the following configurations:

(1) PABX

This solution copies the architecture, and in many cases the equipment of public telephone exchanges and makes use of them to comply with the requirements of private organizations.

The PABX's have the following characteristics:

The centralized configuration which they use is a cause of high fixed costs, which can only be compensated by the installation of a high number of subscribers. However they are optimum when the number of subscribers is very large.

The installation is quite rigid as it is made by means of line pairs asigned to each subscriber. Modifications of the configuration require changes implying service interruptions, and also specialized personnel.

They are intended for voice services. Data services are included at high cost, and with bandwidth limitations in analogic exchanges. Digital PABX's pretend to offer access to data services in a more easy way.

Normally they offer a wide range of net facilities (abbreviated selection, access to closed groups, etc.) They seldom offer the possibility of connection of multifeature telephones.

The PABX's fundamentally are connected to the switched public telephone network. Normally they do not provide access to public or private data networks.

(2) Key Systems

In those cases in which the number of telephone sets does not justify the cost of a PABX, where the functions of a telephone operator must be shared by several subscriber's positions, or when it is desired to simplify access, both internal and external, and provide more complete signaling the normally offered solutions are within the key system category. Key systems have the following characteristics.

Most of them are electromechanical and their normal structure is as a multiwire bus from which the individual terminals are connected. They are, in general, of small capacity, and whithin this range, they become more economical than a PABX.

Normally they are systems provided with blocking as the bus usually provides fewer circuits than connected terminals.

The installation is rigid, in as much as the location of the terminals on the bus is not easily modificable. Thus normally a physical modification of the equipment is required, and consequently, the system must be taken out of service placement to achieve the modification. They do not include data services.

Normally they only provide the facilities peculiar to these type of systems, such as: complete signaling of all positions, transfer facilities, multi-operator, etc., but do not include extra facilities, (directory, agenda, etc.)

Normally they are connected to the public switched telephone network or to a PABX.

These systems are fundamentally intended for voice switching and have a long record in the office communication systems market.

Recently, local area networks have been developed. The notion of a local area network (LAN) has become popular for several reasons. The most evident reason being the suitability of providing a mechanism to allow equipment from different manufacturers, to be interconnected through a common communication media. In this way, mini-processors, terminals, personal computers, text processors, mass memory devices, printers, etc, can be linked.

At the present moment, basically, there are two protocols for local area networks defined by the 802 Commision of the IEEE. The first of them is the CSMA/CD (Carrier Sense Multiple Access/Collision Detection). The first is a packet broadcast system based on Ethernet (industry standard proposed by Digital Equipment, Intel, and Zerox). The second is the "Token Passing" system supported by IBM. However, none of these protocols have been designed for an efficient and economic handling of voice signals. Local area networks have the following general characteristics:

Very wide connectability range, from very few, to hundreds or thousands of terminals. There are diverse architectures, topologies (ring, bus, star) and mechanisms of access (protocols). In general, they often are more costly than the equivalent voice systems.

Usually they are systems employing blocking with a statistical use of the available bandwidth, even during connection.

They usually are very flexible systems, in their installation, and reconfiguration, particularly as compared with conventional data systems.

They are not intended for voice handling, due to the statistical nature of information transfers.

They provide a wide range of data services and facilities including added value functions, that increase the capabilities of the basic service.

The range of terminal devices connected, depends on the manufacturer, but in general, it is very wide.

They are normally connected to public data networks, or otherwise to other terminal devices associated wtih public switched telephone networks by means of vocal band modems.

SUMMARY OF THE INVENTION

The new simultaneous voice and data communications system, with possibility of connection to public or private networks, which is the object of the present invention, is intended to provide an integrated communications system to be utilized in offices or the like, having the advantages of each of the above described systems, but not incurring in their disadvantages.

The characteristics and/or advantages of the new system are:

It is a simultaneous voice and data communications system, with possibility of connection to public or private networks. The system is completely modular, and the cost depends exclusively on the number of equipped stations. It may be applied to large offices, by adding interconnected systems.

The system provides a flexible installation which is easy to connect, and reconfigure.

The system provides simultaneous voice and data services. The interfacing and protocols required for data service do not penalize the telephone service.

The system provides a wide range of voice facilities. In addition to having all of the characteristics of a key system, it offers a user "friendly" mode of operation that guides a user through a host of system features such as abbreviated dialing, agenda, directory, clock, etc.

The connection of a data terminal is simple and flexible. The protocols and formats satisfy the requirements of the present market (RS 232-C, BSC, SDLC, etc.). If the user so requires, additional feature modules may be added.

The hardware is universal, and its adaptation depends on the software.

The system may be connected to the following networks:

Public switched telephone networks both for voice and data services. In the second case, voice band modems are used.

Private telephone networks

Public data networks, both circuit switched and packet switched.

Local area networks.

Integrated services digital networks (ISDN)

BRIEF DESCRIPTION OF THE DRAWINGS

The scope of the invention will be better understood with the aid of the following description given with reference to the included drawings, in which.

DETAILED DESCRIPTION

Figure 1:
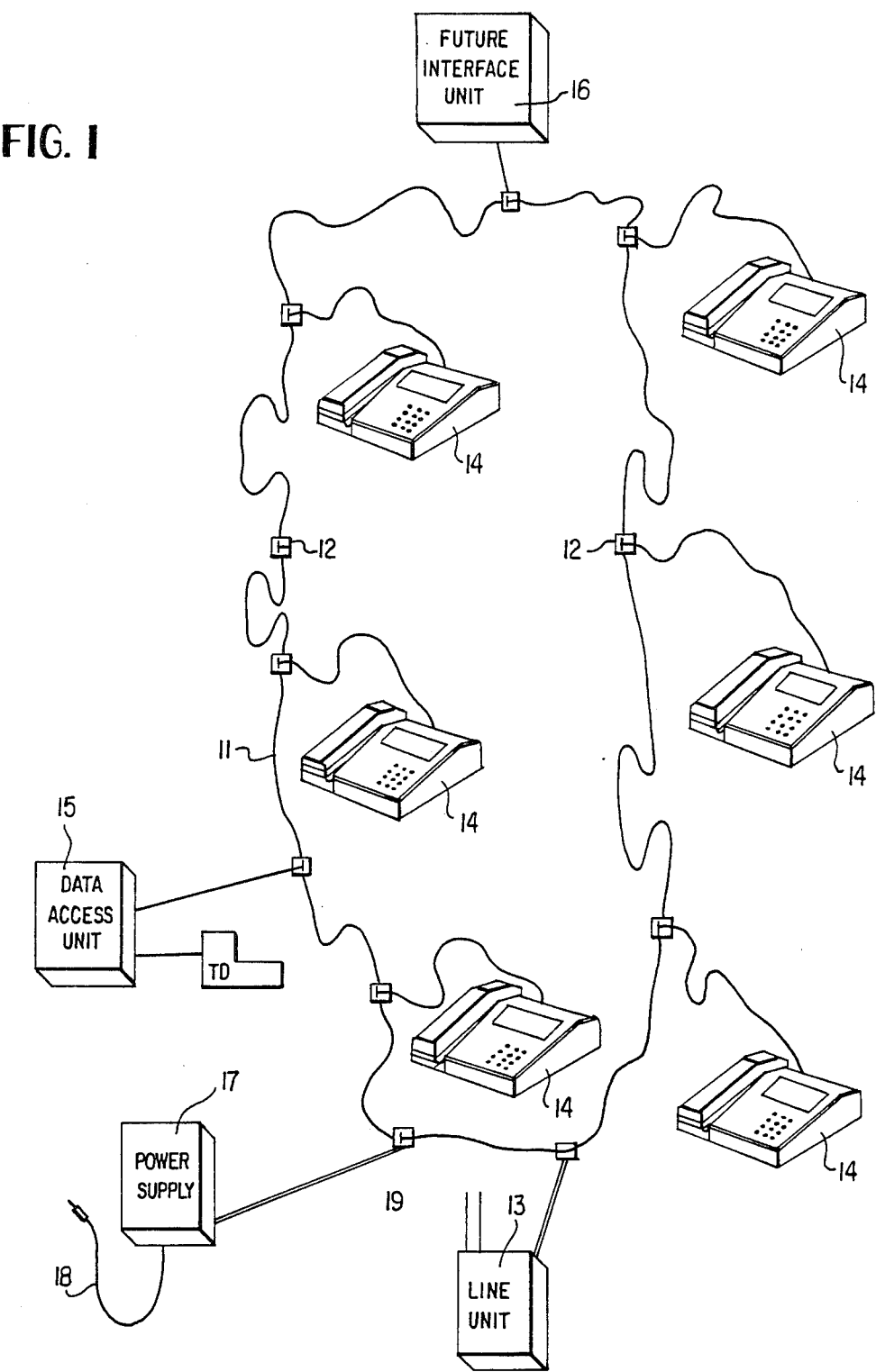
FIG. 1 is an exemplary embodiment of the invention showing the different elements forming the system.

In the different figures, use has been made of corresponding reference numerals symbols for designating structural elements as follows:

11—Ring
12—Tap point to the ring for the different units of the system
13—Line unit (one of the units of the system)
14—Telephone station (another of the units of the system)
15—Data access unit (another of the system's units)
16—Any other future interface (future units of the system)
17—Power supply for the system
18—Power connection to the electrical mains
19—External link, subscriber's loop or PBX extension line.
20—Connection to a data terminal interface
21—Connection to the data terminal interface.
22—Connection to a voice interface in a telephone station
23—Connection to a multiplexing interface in a lines unit.
24—Connection to a parallel control interface.
25—Connection to a series control interface
41—Data input by the user, by means of push button unit
42—Video signal connection
43—Acoustic signal connection
44—User interface
45—Connection to data interface
51—Connection to data terminal interface
61—Modems with automatic call equipment
62—Packet assembly/disassembly equipment
63—Packet switched data network (PSON)
64—Public switched telephone network (PSTN)
65—Analog PABX
66—Simultaneous voice and data communications system according to the present invention.
CC/CC—DC/DC converter
INC—Closed numbering interface
I RDSI—ISON interface
I X-25—X-25 interface $L1, L2 \ldots$
$L_{2n-1}, L_{2n}$ —Telephone lines 1, 2 ... 2n − 1, 2n MCC—Central control module
MCD—Data coding module
MCS—Synchronization and switching module
MDC—Voice coding/decoding module
MIC—Ring interface module
MID—Data interface mocule
MIL—Line interface module
MIU—User interface module
$MLT_{1,n}$—1, n telephone line module
MUX—Multiplexing module
RDSI—Integrated services digital network
Rs 232-C—RS 232-C interfac
S(RDSI)—(ISON) S interface
TD—Data terminal
TD V-24—V-24 data terminal
TD V-25—V-25 data terminal
TD X-25—X-25 data terminal
TN—Normal telephone set
T DSI—ISON termination
V-25—V-25 interface
X-25—X-25 interface The new simultaneous voice and data communications system, with possibility of connection to public or private networks, is a PCM system with a ring topology, allowing connection to the ring of telephone terminals (Key systems, multifunction, etc.) and of data terminals (teleprinters, facsimile, etc.) with possibility of access to any type of external computer network.

An important characteristic that must be emphasized, is that the new system according to this invention is the first commercial system providing simultaneous voice and data service, making use of techniques more related to digital telephony than to data systems to achieve this end. In addition it combines in a single product a digital telephone system and a local area network providing local area network services at low cost.

The system is of modular design having distributed control, which makes the cost a linear function of the number of terminals.

As shown in FIG. 1, the system consists of the following elements: the system ring (11), tap points (12) to the ring for the different units of the system, and the different units of the system line unit (13), the telephone station (14), the autonomous data interface (15), etc. FIG. 1 additionally shows the general power supply for the system (17) which is connected to the electric main via plug and cord (18). The system output (19) for the external links, the subscriber loops, or the extension lines of a PBX are also illustrated.

The ring consists of a physical support for the series transmission of the information (pair of wires, coaxial cable, optical fiber, ets.) which is achieved by means of pulse code modulation, and optionally by a pair of additional conductors intended for the supply of the different units of the system connected to the ring. As long as no use of tele-supply or local supply, of said units is made, the tap points (12) to the ring for the different units of the system, may be installed at any point along the ring and may be configured as a telephone type plug.

When a tap point (12) has no unit connected, it allows propagation of the information from the input to the output, with no modification of the same. However, when a unit is connected to a tap point (12), the unit acts on the tap point (12) diverting the input information towards its own unit, and connecting the output of the same, to the physical support of the transmission (pair of wires, coaxial cable, optical fiber, etc.), in the out-going direction. The tap point (12), restores the ring continuity in case of disconnection of the unit, be it caused either by anomalous operation, failure or physical disconnection.

The different units of the system, in accordance with the modular design of the same, are characterized in that all of them have a common portion, which will be referred as the "Basic Nucleus", and another portion which is specific for each type of unit.

Figure 2:
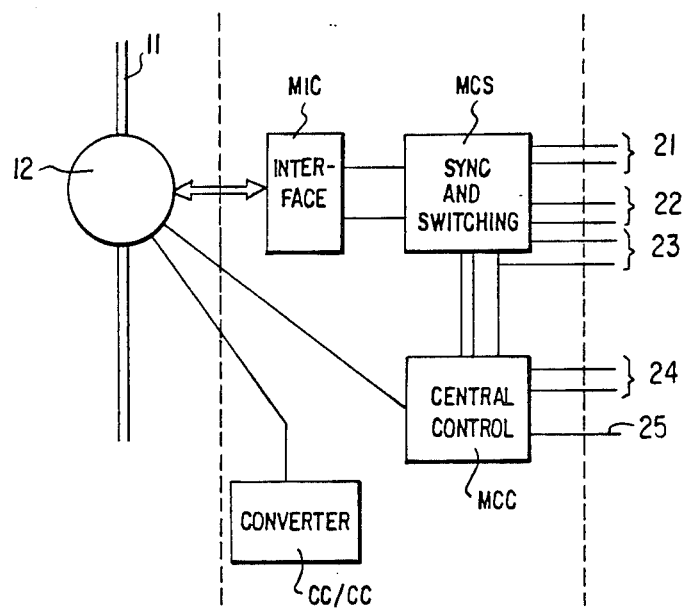
FIG. 2 is a block diagram of a basic nucleus common to all units of the system, and the connection thereof to a ring, and to the specific blocks of the different units of the system.

FIG. 2 shows a block diagram of the Basic Nucleus which is common to any unit to be connected to the ring. This Basic Nucleus consists of a DC/DC converter (CC/CC) and three functional modules: the ring interface module (MIC), the synchonization and switching module (MCS) and the central control module (MCC).

The DC/DC converter (CC/CC) provides the modules of the units with the voltages and currents needed for their operation. Energizing potential for the DC/DC converter is obtained from input voltage from the external supply.

The ring interface module (MIC) accomplishes the following functions:
Insures correct bit transmission between active consecutive units of the ring,
Decodes the information received from the input pair, and synchronizes the phase of its interior clock, with from clock information included in the input train bits,
Delivers to the syncronization and switching module (MCS) the received clock and data,
Codes the binary information from MCS module and sends it to the tap point to the ring.

The syncronization and switching module (MCS) accomplishes the following functions:
Alignment of frames received from the ring interface module (MIC)
Multiplexing and demultiplexing of the informations included in the time slots of the frames.
Storing of the contents of the frames in a buffer memory
Switching to and from the outputs/inputs of voice and data of the corresponding bytes.
Generates and sends to the ring interface module (MIC) the output frames with the new contents of the time slots.
Supervises the quality of transmission of the received frames
Provides, from the central control module (MCC), an orderly access to the information contained in the buffer memory.

The central control module (MCC) accomplishes the following functions:
Controls the operation of the unit
Maintains an image of the state of the complete system as presently configured
Maintains the internal signaling protocol
Insures the dialog with the user in the telephone stations of the system.
Controls the external lines in the lines units.

Figure 3:
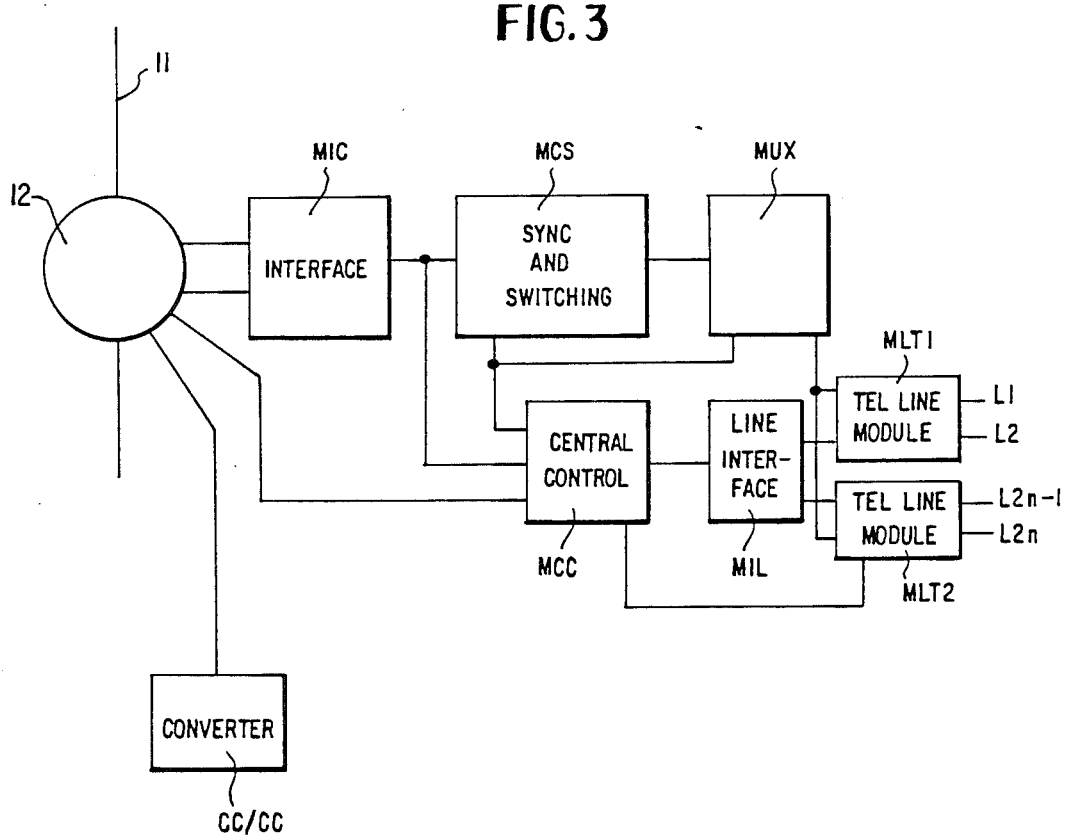
FIG. 3 shows a block diagram of a lines unit.

FIG. 3 shows a block diagram of the line unit, which is one of the different units of the system, that may be connected to the ring. The lines units has for its function to connect the stations of the system to external telephone lines, either directly or through the extensions of a PBX, transforming the digital information of the stations into analog information. As may be seen from FIG. 3, the line unit consists of a Basic Nucleus, common to all the units of the system, and three additional modules: the line interface module (MIL), the telephone line modules (MLT) and the multiplexing module (MUX).

The line interface module accomplishes the following functions:
Interprets the in-coming call signaling from the different lines.
Generates out-going call signaling towards the different lines
Maintains proper timing The telephone line module (MLT), insures the adaptation of the digital signals generated by the system, to the signals accepted by the external telephone lines, or by the external links, and the converse thereof.

The multiplexing module (MUX) combines, or separates, the informations from, or to, the different coders/decoders included in the different MLT modules.

Figure 4:
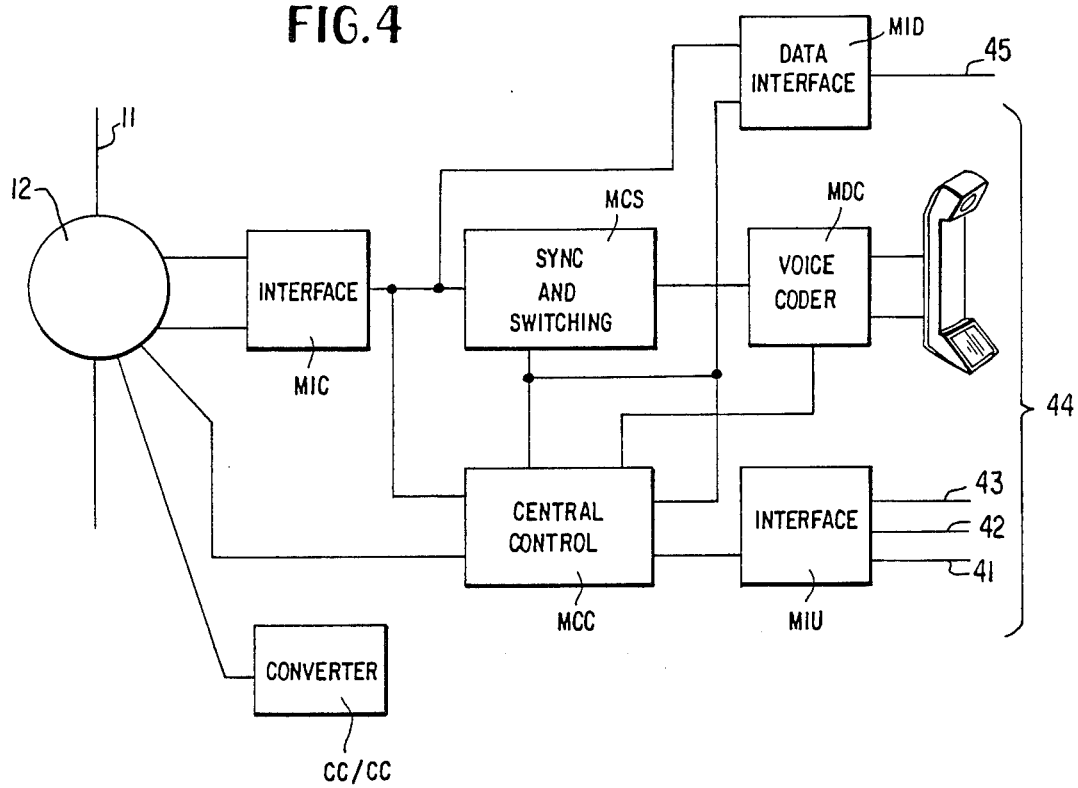
FIG. 4 shows a block diagram of a telephone station.

FIG. 4 shows a block diagram of a telephone station, which is another of the units of the system that may be connected to the ring. The telephone station provides for the design of a multifunction telephone station, with all the features of a telephone set, plus those provided by an alphanumeric display. Such features may include a general and private directory, personal agenda, calendar, clock, automatic dialing with repertoire, etc. Through the telephone station, data terminals may be connected. The telephone station consists of a Basic Nucleus as aforesaid, and three additional modules; the voice coding/decoding module (MDC), the user interface module (MIU), and the data interface module (MID).

The voice coding/decoding module (MDC) accomplishes the following functions:
Takes the digital samples received in the frames through the synchronization and switching module (MCS) of the Basic Nucleus, and converts them to an audible analog signal, delivered to the telephone receiver Takes the analogic signal generated by the microphone, codes it and transfers it to the synchronization and switching module (MCS) of the Basic Nucleus.

The user interface module (MIU) accomplishes the following functions:

Transfers the information inserted by the user by means of push buttons, to the central control module (MCC) of the Basic Nucleus.

Provides the various acoustic signals

Presents information to the user about the state of the system, and provides operating assistance by means of suitable video presentations.

The data interface module (MID) transfers to and receives from data coding module (MCD), the information and control signals required for the correct operation of the latter.

With the elements and units so far described, a basic telephone system would consist of the ring, a supply unit, a series of tap points, a line unit, and a series of telephone stations.

However, the system also provides data services wholly equivalent to those provided by a local area network. In effect, by means of the corresponding interface, a great variety of terminals from different manufacturers may be connected to the ring in such a manner that the same may communicate with each other and have access to public or private external networks.

Figure 5:
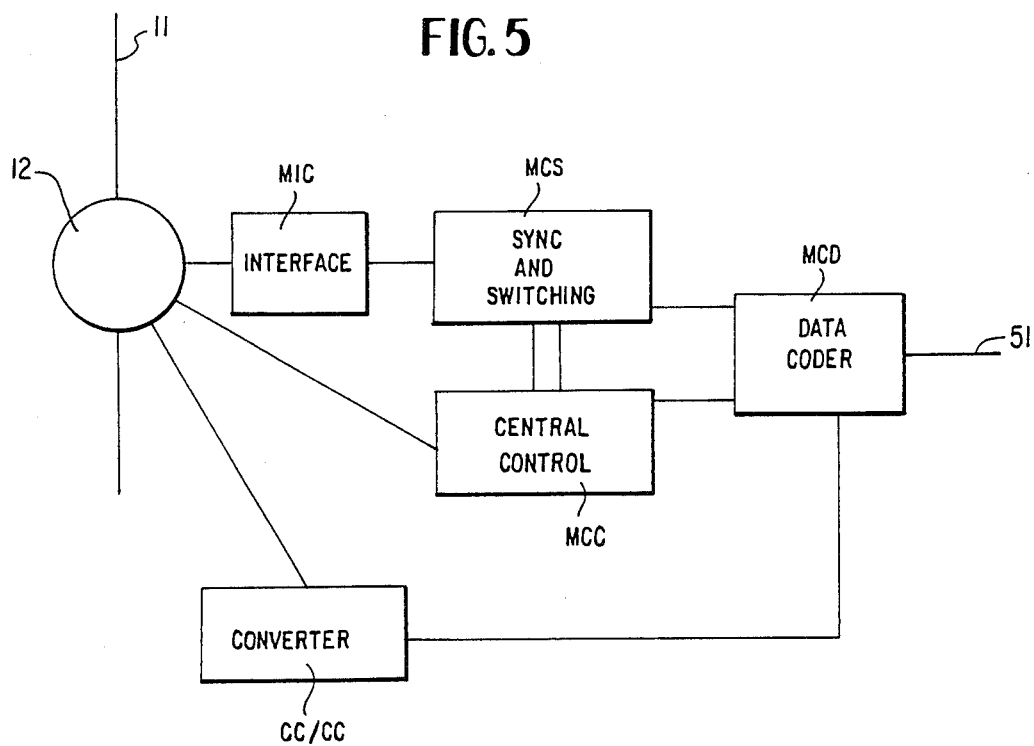
FIG. 5 shows the block diagram of the data access unit.

FIG. 5 shows a block diagram of one of these interfaces, the data access unit. The data access unit consists of a Basic Nucleus (common to all units of the system) and a data coding module (MCD) that accomplishes the following functions:

Procures the connection, use, and operation of channels for data use which are presented by the synchronisating module (MCS) of the Basic Nucleus, through the data interface module (MID) included in the MCD.

Accomplishes data channel multiplexing/demultiplexing to or from the frame, and switching from or to the terminal elements.

Transfers the data to or from the different remote terminal elements connected to the MCD module, directly or through external networks, either private or public, adapting itself in protocol, codes, and transmission characteristics to the requirements of the system, and of the terminal elements.

Accomplishes when necessary, the control, and the procurement of any adapting element to external networks, either private or public.

Controls the establishing and ending protocols of all the data communications.

As a result of the modular structure of the system, the data coding module (MCD) may be directly connected to the data interface module (MID) of a telephone station. This provides a data interface at a much lower cost, as use is made of the Basic Nucleus for the telephone station.

Figure 6:
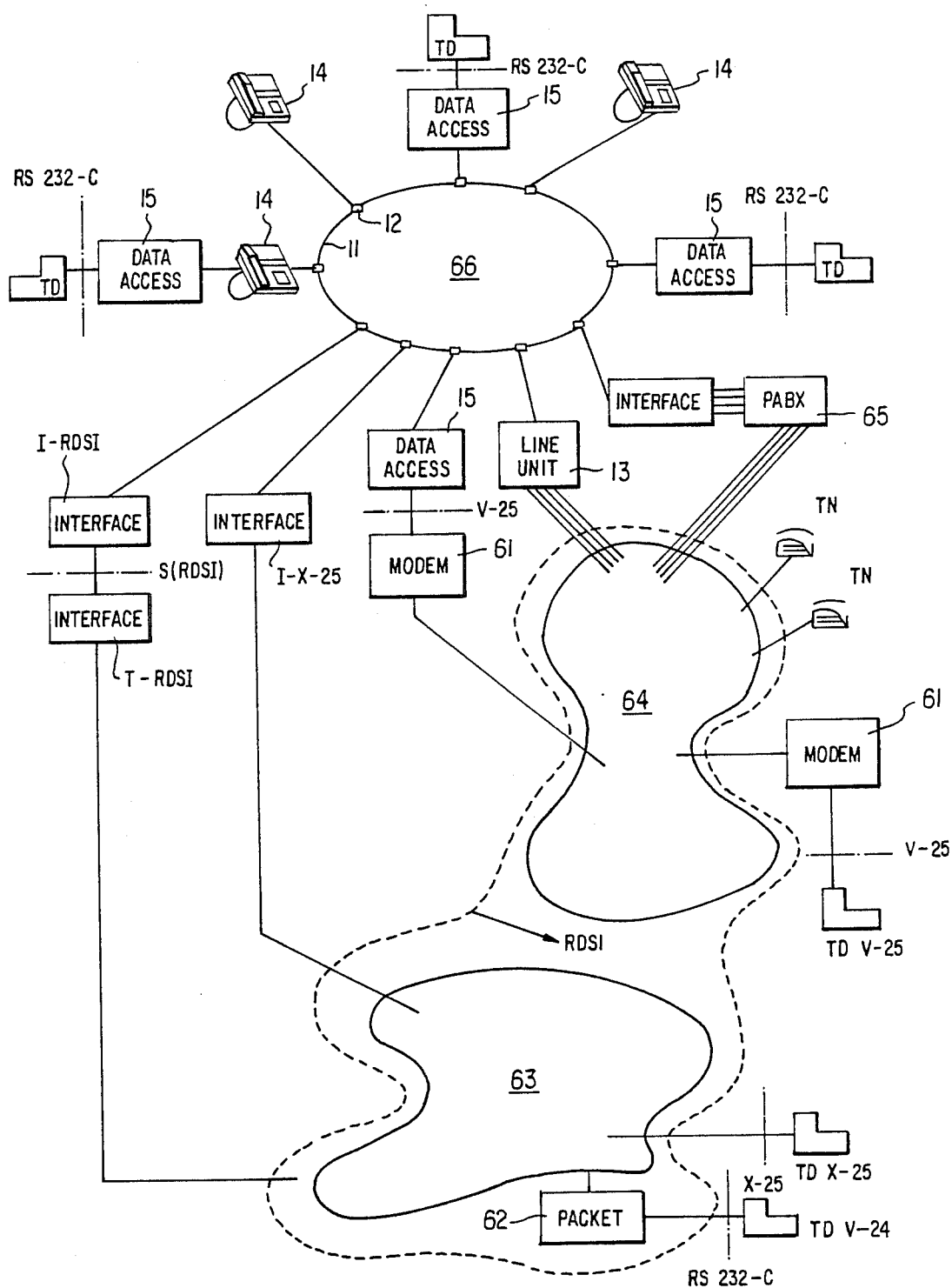
FIG. 6 shows an exemplary generic configuration of the system, having internal and external voice and data communication capability.

FIG. 6 shows a generic configuration of the simultaneous voice and data communication system according to the present invention which provides the possibility of connection to public or private networks. FIG. 6 readily indicates the enormous potential of the system.

In FIG. 6 it may be seen that, connected to the ring are the voice telephone services (telephone stations, lines units, closed numbering interface) and data terminals. The data terminals are connected either through an autonomous data interface, or through a telephone station.

In addition, as shown in FIG. 6, the data terminals may be connected to the ring of the system, with access to terminals or computers connected to the analog public switched telephone network provided, so long as they operate through appropriate modems. This is achieved through a data access unit, and with modems provided with automatic call equipment working in accordance with recommendation V-25 or the C.C.I.T.T.

The figure shows also the connection to a packet switching data network, through an X-25 interface.

Lastly, it is also posible, through corresponding interfaces, to connect to other digital systems, such as other ring systems as described in the present specification, as well as those associated with public exchanges or private branch exchanges, and to integrated services digital networks.

What is claimed is:

1. A communication system for the simultaneous conveying of voice and data messages comprising:

a ring transmission medium for the serial transmission of message information;

a plurality of taps disposed along said ring transmission medium, each of said plurality of taps forming a means to break said ring and connect into it a receiver, each of said plurality of taps for receiving connections from a communications module having at least an input and an output and connecting said communications module to said ring transmission medium, each of said plurality of taps having input and output means connected to said ring transmission medium and acting when no communications module is connected thereto to convey message information on said ring transmission medium directly from said input means to said output means, each of said plurality of taps further acting when a communication module is connected thereto to apply message information on said ring transmission medium to said input of said communications module and to connect said output of said communications module to said ring transmission medium;

a plurality of telephone stations for communicating voice messages, each of said plurality of telephone stations being connected to an individual one of said plurality of taps, each of said plurality of telephone stations taking the form of a communications module having a basic component nucleus for interfacing with said ring transmission medium and at least one additional component for performing telephone station functions, said basic component nucleus comprising dc to dc converter means, ring interface means, synchronism and switching means and central control means;

a data access unit for connection to one of said plurality of taps for coupling data messages to said ring transmission medium, said data access unit including said basic component nucleus for interfacing with said ring transmission medium and at least a further component for coding digital data applied thereto;

power supply means connected to an individual one of said plurality of taps, said power supply means enabling appropriate voltage and current levels to be provided to each communications module connected to one of said plurality of taps; and means for applying digital data to said data access unit for application to said ring transmission medium.

2. The communications system according to claim 1 wherein said dc to dc converter means supplies voltage and current levels from said power device supply means connected to said basic component nucleus.

3. The communications system according to claim 1 wherein said ring interface means acts to ensure correct bit transmission between active consecutive communication modules connected to said ring transmission medium, decodes received message information and conveys data between said ring transmission medium and said synchronization and switching means.

4. The communications system according to claim 1 wherein said message information serially conveyed on said ring transmission medium is pulse code modulated message information.

5. The communications system according to claim 1 wherein each communications module connected to one of said plurality of taps includes said basic component nucleus.

6. A communications systems for the simultaneous conveying of voice and data messages, comprising:
   a ring transmission medium for the serial transmission of pulse code modulated message information;
   a plurality of taps disposed along said ring transmission medium, each of said plurality of taps forming a means to break said ring and connect into it a receiver, each of said plurality of taps for receiving connections from a communications module having at least an input and an output and connecting said communications module to said ring transmission medium, each of said plurality of taps having input and output means connected to said ring transmission medium and acting when no connections module is connected thereto to convey pulse code modulated message information on said ring transmission medium directly from said input means to said output means, each of said plurality of taps further acting when a communications module is connected thereto to apply pulse code modulated message information on said ring transmission medium to said input of said communications module and to connect said output of said communications module to said ring transmission medium;
   a plurality of telephone stations for communicating voice messages, each of said plurality of telephone stations being connected to an individual one of said plurality of taps, each of the said plurality of telephone stations taking the form of a communications module having a basic component nucleus for interfacing with said ring transmission medium and at least one additional component for performing telephone functions, each communications module connected to one of said plurality of taps including said basic component nucleus, said basic component nucleus comprising dc to dc converter means, ring interface means, synchronism and switching means, and central control means;
   a data access unit for connection to one of said plurality of taps for coupling data messages to said ring transmission medium, said data access unit including said basic component nucleus for interfacing with said ring transmission medium and at least a further component for coding digital data applied thereto; and
   means for applying digital data to said data access unit for application to said ring transmission medium.

7. The communications system according to claim 6 additionally comprising power supply means connected to an individual one of said plurality of taps, said power supply means enabling appropriate voltage and current levels to be provided to each communications module connected to one of said plurality of taps.

8. The communications system according to claim 6 additionally comprising a line unit connected to one of said plurality of taps, said line unit for interconnection to a switched, analog telephony system, said lines unit including said basic component nucleus for interfacing with said ring transmission medium.

9. The communications system according to claim 7 wherein said dc to dc converter means supplies voltage and current levels from said power device supply means connected to said basic component nucleus.

10. The communications system according to claim 7 wherein said ring interface means acts to ensure correct bit transmission between active consecutive communication modules connected to said ring transmission medium, decodes received message information and conveys data between said ring transmission medium and said synchronization and switching means.

11. The communications system according to claim 10 wherein said synchronization and switching means includes buffer means and acts to align frames of data received from said ring transmission medium, stores said frames in said buffer means and performs multiplexing and demultiplexing functions.

12. The communications system according to claim 11 wherein said control means maintains an image of the actual state of the communications system, controls internal signaling protocol and controls external lines and units.

13. The communications system according to claim 12 wherein said component for coding digital data performs data channel multiplexing/demultiplexing and may transfer data to and from different remote terminal means interfaced thereto.

14. The communications system according to claim 13 wherein said message information serially conveyed on said ring transmission medium is pulse code modulated message information.

15. The communications system according to claim 14 wherein each communications module connected to one of said plurality of taps includes said basic component nucleus.

16. The communications system according to claim 15 additionally comprising a line unit connected to one of said plurality of taps, said line unit for interconnection to a switched, analog telephony system, said lines unit including said basic component nucleus for interfacing with said ring transmission medium.

* * * * *